(12) United States Patent
Hamadani et al.

(10) Patent No.: US 8,856,421 B2
(45) Date of Patent: Oct. 7, 2014

(54) MULTI-PROCESSOR ARCHITECTURE USING MULTIPLE SWITCH FABRICS IMPLEMENTING POINT-TO-POINT SERIAL LINKS AND METHOD OF OPERATING SAME

(71) Applicant: Brocade Communications Systems, Inc., San Jose, CA (US)

(72) Inventors: Mehrdad Hamadani, San Jose, CA (US); Deepak Bansal, San Jose, CA (US); Sam Htin Moy, Daly City, CA (US); Steenivasulu Malli, Fremont, CA (US); David Cheung, Cupertino, CA (US); Mani Kancherla, Milpitas, CA (US); Sridhar Devarapalli, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

(21) Appl. No.: 13/715,674

(22) Filed: Dec. 14, 2012

(65) Prior Publication Data
US 2013/0103881 A1 Apr. 25, 2013

Related U.S. Application Data

(63) Continuation of application No. 12/501,389, filed on Jul. 10, 2009, now Pat. No. 8,335,884.

(51) Int. Cl.
*G06F 13/00* (2006.01)
*G06F 13/40* (2006.01)

(52) U.S. Cl.
CPC .... *G06F 13/4022* (2013.01); *G06F 2213/0026* (2013.01)
USPC .......................................................... 710/316

(58) Field of Classification Search
USPC .............. 710/306–317, 36–42; 709/238–239
See application file for complete search history.

(56) References Cited

U.S. PATENT DOCUMENTS

| | | | |
|---|---|---|---|
| 7,046,668 B2 | 5/2006 | Pettey et al. | |
| 7,103,064 B2 | 9/2006 | Pettey et al. | |
| 7,457,906 B2 | 11/2008 | Pettey et al. | |
| 7,480,303 B1 * | 1/2009 | Ngai | 370/395.5 |
| 7,493,416 B2 | 2/2009 | Pettey | |
| 7,502,370 B2 | 3/2009 | Pettey | |
| 7,512,717 B2 | 3/2009 | Pettey | |
| 7,562,176 B2 * | 7/2009 | Kloeppner et al. | 710/314 |

(Continued)

OTHER PUBLICATIONS

Brewer, Jim et al.; Dell Technology White Paper; PCI Express Technology, Feb. 2004; 9 pages.

(Continued)

*Primary Examiner* — Raymond Phan
(74) *Attorney, Agent, or Firm* — Bever, Hoffman & Harms, LLP (57) ABSTRACT

A multi-processor architecture for a network device that includes a plurality of barrel cards, each including: a plurality of processors, a PCIe switch coupled to each of the plurality of processors, and packet processing logic coupled to the PCIe switch. The PCIe switch on each barrel card provides high speed flexible data paths for the transmission of incoming/outgoing packets to/from the processors on the barrel card. An external PCIe switch is commonly coupled to the PCIe switches on the barrel cards, as well as to a management processor, thereby providing high speed connections between processors on separate barrel cards, and between the management processor and the processors on the barrel cards.

17 Claims, 4 Drawing Sheets

(56) References Cited

U.S. PATENT DOCUMENTS

| | | |
|---|---|---|
| 7,617,333 B2 | 11/2009 | Pettey |
| 7,620,064 B2 | 11/2009 | Pettey et al. |
| 7,620,066 B2 | 11/2009 | Pettey et al. |
| 7,664,909 B2 | 2/2010 | Pettey |
| 7,676,625 B2 * | 3/2010 | Cassiday et al. ............ 710/316 |
| 7,706,372 B2 | 4/2010 | Pettey et al. |
| 7,782,893 B2 | 8/2010 | Pettey et al. |
| 8,032,659 B2 | 10/2011 | Pettey |
| 8,346,884 B2 | 1/2013 | Pettey |
| 2009/0240869 A1 * | 9/2009 | O'Krafka et al. ............ 711/103 |
| 2010/0014526 A1 | 1/2010 | Chavan et al. |
| 2012/0218905 A1 | 8/2012 | Pettey |
| 2012/0221705 A1 | 8/2012 | Pettey |
| 2012/0250689 A1 | 10/2012 | Pettey |

OTHER PUBLICATIONS

Chu, Will; Clocking-in: Real-world MicroTCA needs close clocking/fabric interaction, Oct. 2006; 7 pages.

Intel; PCI Express—Wikpedia, Oct. 28, 2008 (see last page); 11 pages.

* cited by examiner

MULTI-PROCESSOR ARCHITECTURE USING MULTIPLE SWITCH FABRICS IMPLEMENTING POINT-TO-POINT SERIAL LINKS AND METHOD OF OPERATING SAME

RELATED APPLICATION

This application is a continuation of U.S. patent application Ser. No. 12/501,389 filed Jul. 10, 2009, now U.S. Pat. No. 8,335,884, to issue Dec. 18, 2012.

FIELD OF THE INVENTION

The present invention relates to multi-processor network devices.

RELATED ART

The increase in Internet traffic, particularly streaming media, has created a need for much higher performance networking products in the data center. However, it is also necessary to limit the power requirements of this same data center. This creates a need for a new architecture for network switching devices.

A common approach for achieving higher performance in network switching devices is to increase the operating frequency of the microprocessors used in the network switching device. While increasing the operating frequency has been the preferred method to gain higher performance, this technique is no longer viable. This is partly due to limitations in the power budgets of the network switching devices, as well as limitations in the power allowed in the data center environments where such network switching devices are commonly used.

The semiconductor industry has recognized this problem, and in response, has begun using multi-core microprocessors or CMPs, as opposed to using larger, more integrated, higher frequency uniprocessor architectures. CMPs avoid problems of complexity, high energy consumption and heat dissipation, by filling up a processor die with multiple, relatively simpler, lower frequency processor cores, instead of one large high frequency processor core.

However, even if a network switching device implements multi-core processors, it is a challenge to increase network switching performance by orders of magnitude, which is demanded by the current commercial environment.

Figure 1:
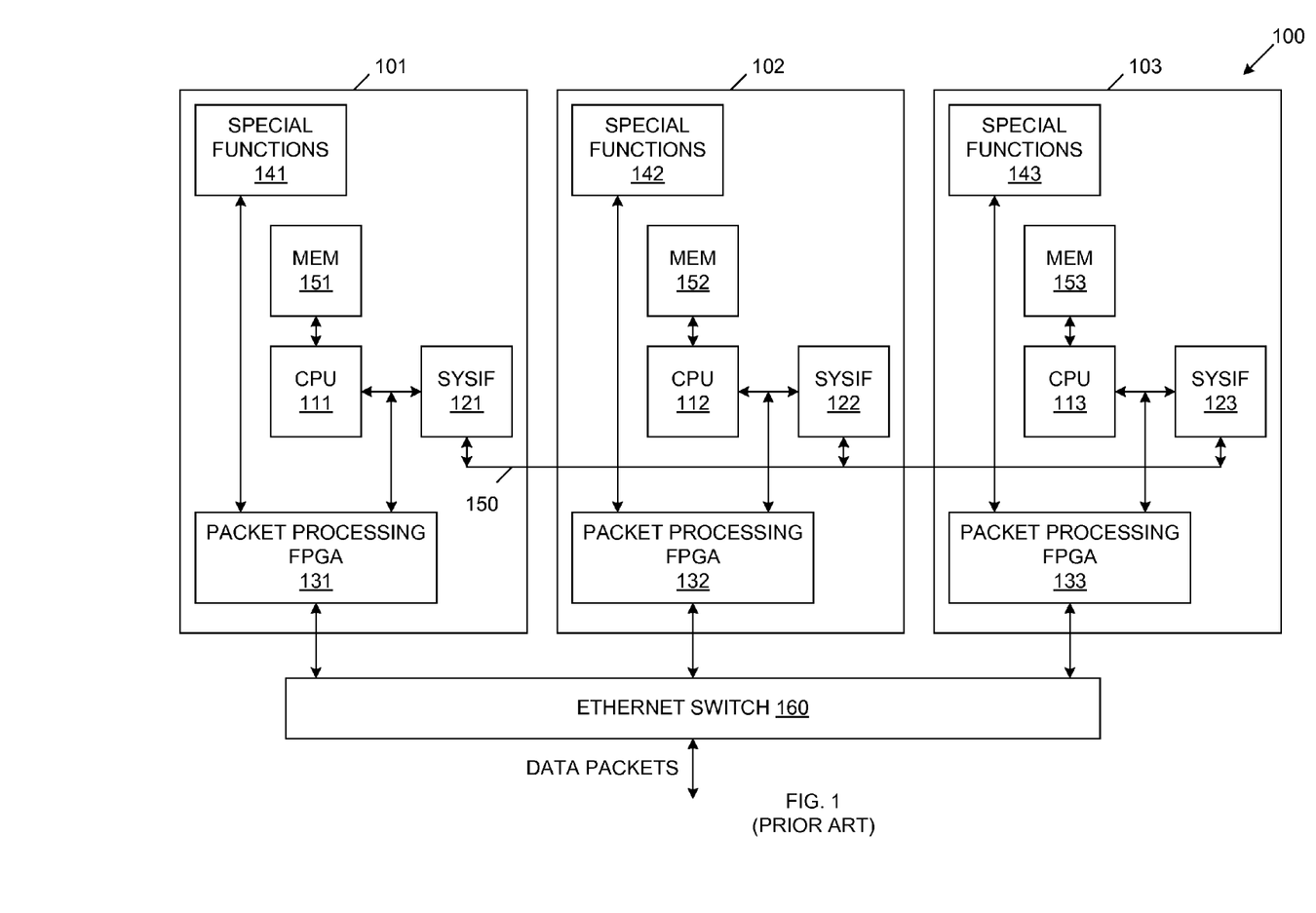
FIG. 1 is a block diagram of a conventional network switching device.

FIG. 1 is a block diagram of a conventional network switching device 100, which includes three processing planes 101-103. Processing planes 101-103 include processing cores (CPUs) 111-113, respectively, system interface chips 121-123, respectively, packet processing FPGAs 131-133, respectively, special function blocks 141-143, respectively, and memory subsystems 151-153, respectively. Processing planes 101-103 are connected by a customized Ethernet switch 160. Switch 160 routes each incoming data packet to one of the packet processing FPGAs 131-133. Each of the packet processing FPGAs 131-133 buffers the received data packets, such that all packet buffering is performed by the packet processing FPGAs 131-133 after the data packets are switched to a specific processing plane. Processing cores 111-113 transfer the data packets from packet processing FPGAs 131-133, respectively, to memory subsystems 151-153, respectively. Undesirably, each processing core 111-113 can only readily access memory located within its own processing plane 101-103.

A separate control plane is designed using system interface (SYSIF) chips 121-123, which are coupled to a parallel system bus 150. Parallel system bus 150 is also coupled to a management processor (not shown). Parallel system bus 150 limits the number of processing planes which can be used in network switching device 100, because each additional processing plane adds significant loading to the system bus 150.

As described above, each of the processing planes 101-103 has a corresponding special functions block 141-143, respectively. The functions implemented by special functions blocks 141-143 may include, for example, SSL or hardware compression. The architecture of network switch 100 results in limited flexibility in the use of special functions blocks 141-143. For example, the special functions provided by special functions block 141 would only be readily available to packets stored in packet processing FPGA 131/memory subsystem 151. Moreover, a special functions block must be provided in each of the processing planes 101-103 to make a special function available within each of these processing planes 101-103.

The maximum number of processing cores 111-113 is limited due to power and real estate limitations within the network switching device 100. It would therefore be desirable to have a network switching device capable of handling increased Internet traffic, while maintaining low power consumption.

SUMMARY

Accordingly, the present invention provides a multi-processor network device (e.g., a layer 4-7 application switch) having a scalable design that is built on a fabric of PCI Express switches. More specifically, a PCI Express switching fabric is used to connect a plurality of processing cores in the application layer. The number of processing cores that can be connected through the PCI Express switching fabric is substantially higher than the number of processing cores that can be connected in a conventional network switching device. By increasing the number of processing cores that can be implemented in a network switching device, the present invention provides for increased processor performance (without increasing the operating frequency of the processing cores). In accordance with one embodiment, a plurality of blades, each including a plurality of core processors and a PCI Express switching fabric may be used to implement a network switching device. The inherent distributed nature of the architecture of the present invention spreads the heat generated from the processing cores throughout the network switching device. In addition, the use of separate blades allows the network switching device to be easily upgraded by replacing existing blades with new blades having upgraded processors.

The present invention will be more fully understood in view of the following description and drawings.

DETAILED DESCRIPTION

PCI Express (PCIe) is a computer expansion card interface format. PCIe is typically used to connect a motherboard to peripheral devices in a PC. Unlike previous computer expansion card interfaces, which implemented a shared parallel bus structure, PCIe is structured around point-to-point serial (1-bit) links called lanes. Each PCIe lane carries information at a maximum theoretical data rate of 250 MB/s in each direction (PCIe 1.0). PCIe lane counts are written with an "x" prefix (e.g., x1 for a single-lane structure and x16 for a 16-lane structure).

The present invention provides a unique method to use PCIe as a fabric in the application layer of a multi-processor network device. More specifically, the present invention uses PCIe switches (and PCIe lanes) to cluster a large number of multi-core processors to increase processing performance.

Figure 2:
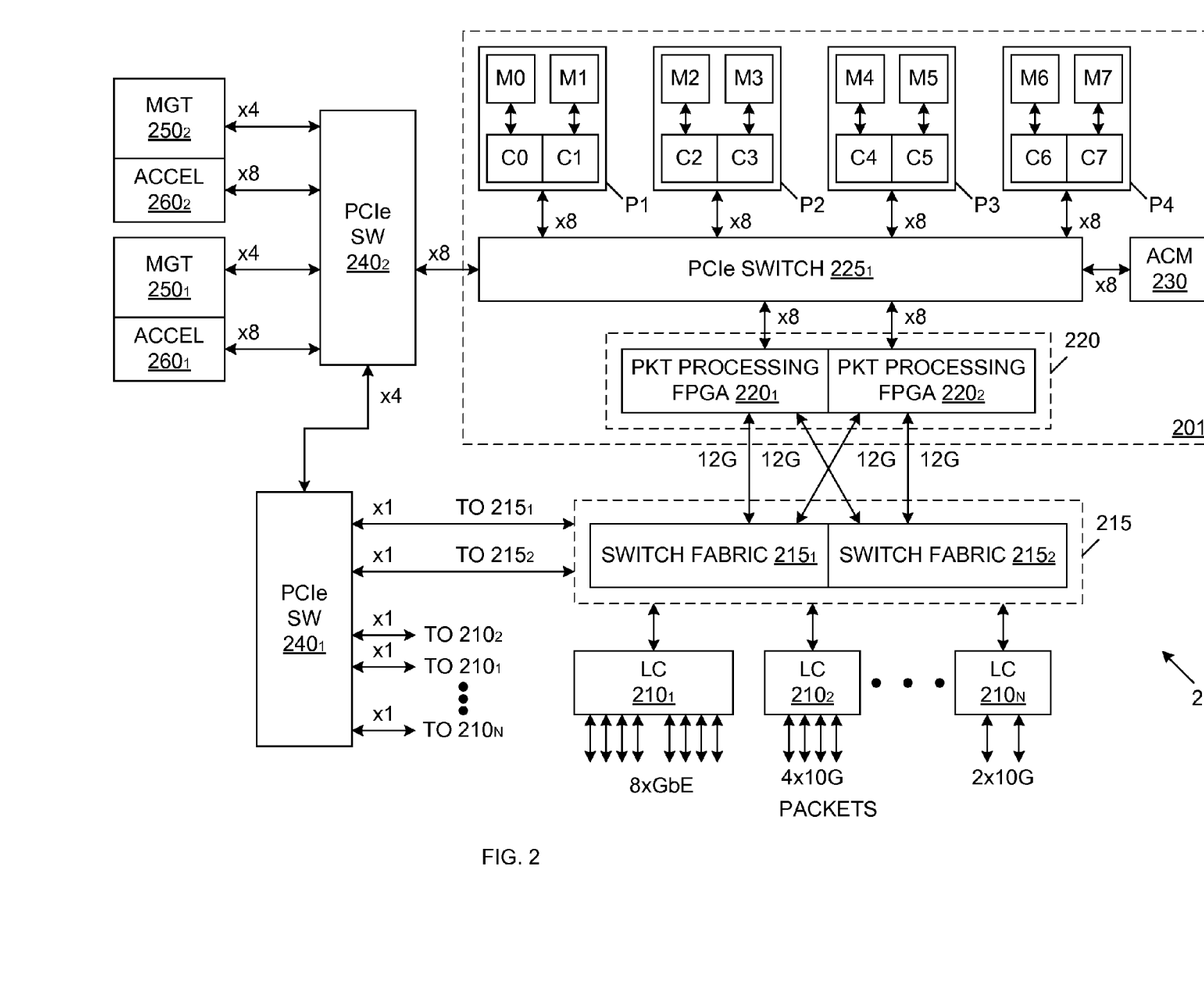
FIG. 2 is a block diagram of a multi-core network device in accordance with one embodiment of the present invention.

FIG. 2 is a block diagram of a multi-core network device 200 in accordance with one embodiment of the present invention. Multi-core network device 200 includes line cards $210_1$-$210_N$, switch fabric 215, application services module (ASM) $201_1$, PCIe switches $240_1$-$240_2$, management processors $250_1$-$250_2$ and processor accelerators $260_1$-$260_2$.

Each of the line cards $210_1$-$210_N$ includes one or more ports for receiving/sending data packets. In the described embodiments, line card $210_1$ includes 8×GbE ports, line card $210_2$ includes 4×10 GbE ports, and line card $210_N$ includes 2×10 GbE ports. However, it is understood that the number and speed of the ports provided by line cards $210_1$-$210_N$ can have other values in other embodiments. Moreover, although the example of FIG. 2 indicates that there are at least 3 line cards, it is understood that fewer line cards may be used in other embodiments. Each of the line cards $210_1$-$210_N$ is coupled to PCIe switch $240_1$ by a x1 PCIe lane, thereby enabling the line cards $210_1$-$210_N$ to be configured by management processor 250' (or management processor $250_2$).

Line cards $210_1$-$210_N$ are also coupled to switch fabric 215. Switch fabric 215 includes two switch fabric chips $215_1$-$215_2$, which may be, for example, cross-bar switches available from Broadcom Corporation (www.broadcom.com) as part number BCM56720. Each of the switch fabric chips $215_1$-$215_N$ is coupled to PCIe switch 240' by a x1 PCIe lane, thereby enabling the switch fabric chips $215_1$-$215_N$ to be configured/controlled by management processor 250' (or management processor $250_2$).

Application services module (ASM) 201' includes L4-L7 packet processor 220, PCIe switch $225_1$, accumulator logic 230, and multi-core processors P1-P4. L4-L7 packet processor 220 includes a pair of packet processing FPGAs $220_1$ and $220_2$. Each of the packet processing FPGAs $220_1$ and $220_2$ is coupled to each of the switch fabric chips $215_1$-$215_2$ by a HiGig2 (12G) connection. Two switch fabric chips $215_1$-$215_2$ are used in the described examples in order to provide a large number of available high-speed port connections for additional packet processing FPGAs that may be used in the expansion of the processor architecture (See, e.g., FIG. 3). In alternate embodiments, switch fabric chips $215_1$-$215_2$ may be replaced by a single switch fabric chip having an adequate number of high-speed ports to support a desired processor size.

PCIe switch $225_1$ is coupled to each of the packet processing FPGAs $220_1$-$220_2$, each of the multi-core processors P1-P4, the accumulator logic 230 and the PCIe switch $240_2$ by x8 PCIe lanes. In one embodiment, PCIe switch $225_1$ is a conventional device available from Integrated Device Technology (IDT) Inc. (www.idt.com) as part number PES64H16. Note that two packet processing FPGAs $220_1$-$220_2$ are used in the described examples to provide two sets of x8 PCIe lanes to PCIe switch $225_1$. Each of the packet processing FPGAs $220_1$-$220_2$ is capable of processing 12 Gbps of data at a time.

Each of multi-core processors P1, P2, P3 and P4 includes a corresponding pair of processing cores, C0-C1, C2-C3, C4-05 and C6-C7, respectively, and a corresponding pair of processor memory blocks M0-M1, M2-M3, M4-M5 and M6-M7, respectively. Each pair of processing cores C0-C1, C2-C3, C4-05 and C6-C7 may be implemented, for example, by a dual-core Power PC processor, available from Freescale Semiconductor (www.freescale.com) as part number MPC8572. Each of the external processor memory blocks M0-M7 may be, for example a 1 GB SDRAM in Mini-DIMM module form factor. In one embodiment, each of the multi-core processors P1-P4 has an operating frequency of about 1.2 to 1.5 MHz. This relatively low operating frequency allows multi-core processors P1-P4 to operate with relatively low power requirements and at relatively low temperatures. Although four multi-core processors P1-P4 are included on application services module $201_1$ in the described embodiment, it is understood that other number of multi-core processors may be included on application services module $201_1$ in other embodiments.

Accumulator logic 230, which operates to update global counters within multi-core processors P1-P4, is described in more detail in commonly owned, co-pending U.S. patent application Ser. No. 12/489,366, which is hereby incorporated by reference in its entirety.

PCIe switch $240_2$ is also coupled to: management processors $250_1$-$250_2$ (by x4 PCIe lanes), processor accelerators $260_1$-$260_2$ (by x8 PCIe lanes), and PCIe switch $240_1$ (by a x4 PCIe lane). In the described examples, management processor $250_1$ controls the operation of multi-core network device 200, while management processor $250_2$ serves as a redundant processor that may be enabled if management processor $250_1$ fails. In one embodiment, management processor $250_1$ includes a dual-core Power PC processor, available from Freescale Semiconductor as part number MPC8572, and 2 GB of SDRAM processor memory.

Processor accelerator $260_1$ is an optional device that performs special functions (e.g., SSL or hardware compression) to reduce (offload) the processing requirements of management processor $250_1$ and multi-core processors P1-P4. Processor accelerator $260_2$ operates as a backup to processor accelerator $260_1$. In one embodiment, processor accelerator $260_1$ is a Nitrox® security processor available from Cavium Networks (www.cavium.com) as part number CN1620. This chipset performs SSL acceleration and supports a maximum of 17,000 RSA operations per second.

In accordance with one embodiment, all of the elements of application services module $201_1$ are located on a common barrel card (or blade). Multi-core network device 200 can be expanded by adding additional application service modules.

Figure 3:
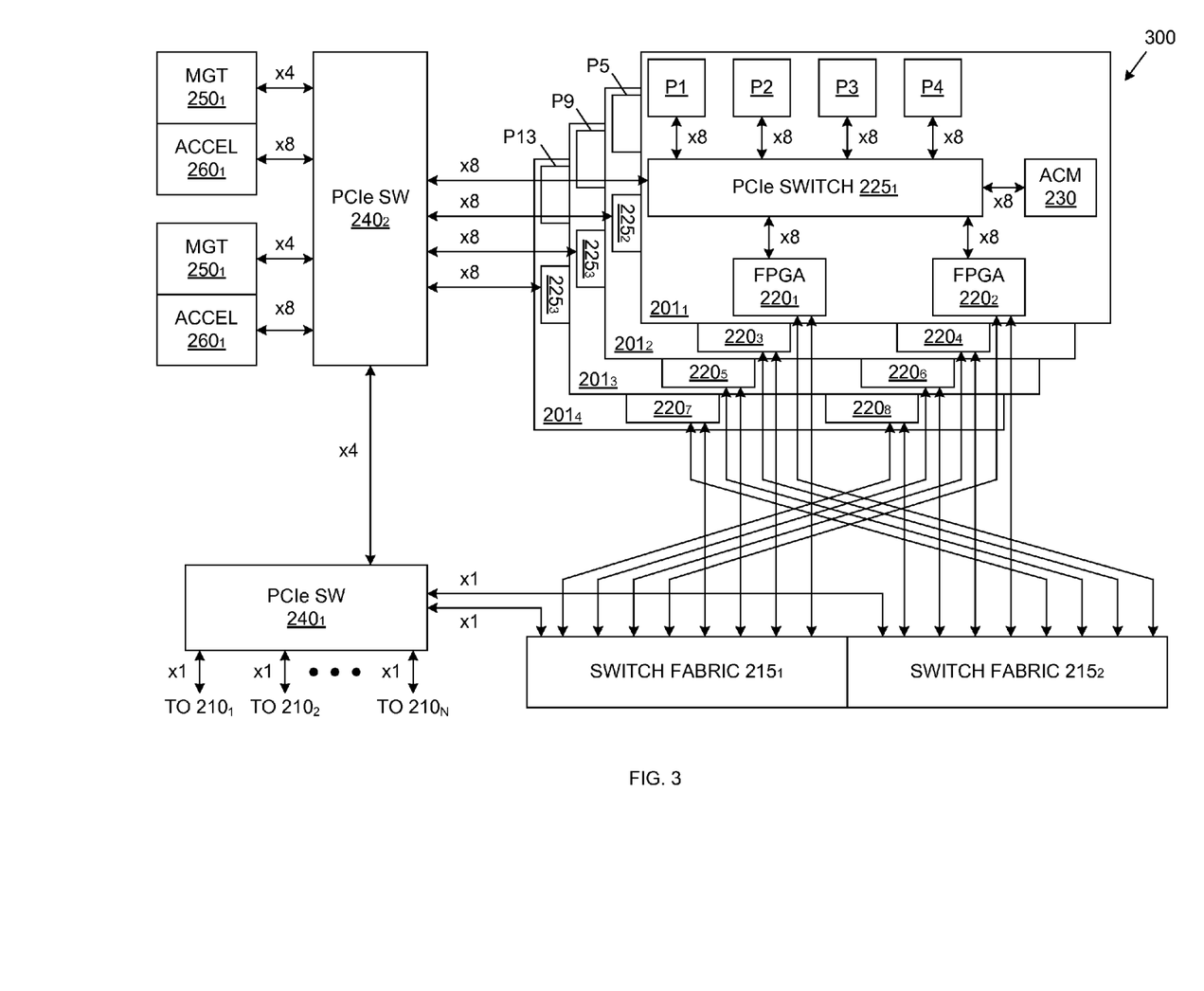
FIG. 3 is a block diagram of an expanded multi-core network device in accordance with one embodiment of the present invention.

FIG. 3 is a block diagram of a multi-core network device 300, which is created by adding additional application service modules $201_2$-$201_4$ to the multi-core network device 200 of FIG. 2. Similar elements in FIGS. 2 and 3 are labeled with similar reference numbers. Note that line cards $210_1$-$210_N$ are not shown in FIG. 3 for clarity. Application service modules $201_2$-$201_4$ are identical to application service module $201_1$ in the illustrated example (although this is not necessary). Application service modules $201_2$, $201_3$ and $201_4$ include packet processing FPGAs $220_3$-$220_4$, $220_5$-$220_6$ and $220_7$-$220_8$, respectively (which are identical to packet processing FPGAs $220_1$-$220_2$). Each of the packet processing FPGAs $220_3$-$220_8$ is coupled to switch fabric chips $215_1$-$215_2$ by Higig2 (12G) connections as illustrated. Application service modules $201_2$, $201_3$ and $201_4$ also include PCIe switches $225_2$, $225_3$ and $225_4$, respectively (which are identical to PCIe switch $225_1$). PCIe switches $225_2$, $225_3$ and $225_4$ are coupled to packet processing FPGAs $220_3$-$220_4$, $220_5$-$220_6$ and $220_7$-$220_8$, respectively, by x8 PCIe lanes. Each of the PCIe switches $225_2$, $225_3$ and $225_4$ is also coupled to PCIe switch $240_2$ by a x8 PCIe lane.

Application service modules $201_2$, $201_3$ and $201_4$ also include multi-core processors P5-P8, P9-P12 and P13-P16, respectively (which are identical to multi-core processors P1-P4). Multi-core processors P5-P8, P9-P12 and P13-P16 are coupled to PCIe switches $225_2$, $225_3$ and $225_4$, respectively, by x8 PCIe lanes.

In accordance with one embodiment, each of the application services modules $201_2$, $201_3$, and $201_3$ is located on a corresponding barrel card (or blade). Thus, the architecture of multi-core network device 200/300 is readily expandable by adding barrel cards that include additional application service modules. The multi-core network device 300 includes sixteen multi-core processors P1-P16, greatly increasing the processing power available in conventional network devices (FIG. 1). Advantageously, the processors P1-P16 may be distributed over multiple cards, thereby decentralizing the build-up of heat within multi-core network device 300.

The operation of multi-core network devices 200/300 will now be described. In general, line cards $210_1$-$210_N$ and switch fabric 215 implement L2-L3 processing in a manner known to those of ordinary skill in the art. Line cards $210_1$-$210_N$ and switch fabric 215 are configured by management processor $250_1$ (via PCIe switches $240_1$-$240_2$ and the associated x1 PCIe lanes). Packets are received by line cards $210_1$-$210_N$ (wherein N is any positive integer). Each of line cards $210_1$-$210_N$ decodes the header of each received packet, and determines where the received packet should be routed. For example, a packet received by a line card may be: routed back out through the same line card; routed through switch fabric 215 to another line card; or, routed through switch fabric 215 to one of the application services modules $201_1$-$201_4$.

Packets routed through switch fabric 215 to the application services modules $201_1$-$201_4$ will be received by one of the packet processing FPGAs $220_1$-$220_8$. In one embodiment, switch fabric 215 has the capacity to simultaneously route a 12G packet stream to each of the packet processing FPGAs $220_1$-$220_8$. In general, a packet processing FPGA receiving a packet from switch fabric 215 will perform L4-L7 processing on the received packet, and forward the processed packet to a selected one of the multi-core processors (located on the same application services module). Note that the multi-core processor selected to receive the processed packet is identified by a flow lookup operation performed on the line card $210_x$ that originally processed the packet. For example, packet processing FPGA $220_1$ may forward a packet received from switch fabric 215 to processor P3. In this case, packet processing FPGA $220_1$ controls the corresponding PCIe switch $225_1$ to route the processed packet to the identified multi-core processor P3. The processed packet is transmitted to the selected multi-core processor P3 on a x8 PCIe lane, with a throughput of about 12 Gbps. Note that each multi-core processor P1-P16 includes a PCIe interface/controller that enables the processor to receive the packet on the x8 PCIe lane. Within the selected multi-core processor P3, the PCIe controller causes the received packet to be written directly to the associated processor memory M4-M5. That is, the packet processing FPGAs $220_1$-$220_2$ effectively write the processed packets directly to the processor memory. In accordance with one embodiment, the packet processing FPGAs $220_1$-$220_8$ implement write operations using a posted write, direct memory access (DMA) process.

The multi-core processors P1-P16 transmit packets in the following manner. The present example will describe the transmission of a packet from multi-core processor P1. The multi-core processor P1 retrieves a packet from one of its memory blocks M0-M1, and transmits this packet to one of the packet processing FPGAs $220_1$-$220_2$ through PCIe switch $225_1$. The packet is transmitted on a x8 PCIe lane, with a throughput of about 12 Gbps. The packet processing FPGA that receives the packet will perform L4-L7 processing, and then transmit the processed packet to switch fabric 215. Switch fabric 215 then transmits the processed packet to the appropriate line card.

Packets may also be transferred between the multi-core processors P1-P16 and the management processor $250_1$ via the PCIe switches $225_1$-$225_4$ and PCIe switch $240_2$ to implement inter processor communication (IPC). Packets may also be transferred between the multi-core processors P1-P16 and the processor accelerator $260_1$ via the PCIe switches $225_1$-$225_4$ and PCIe switch $240_2$ to implement the special functions supported by the processor accelerator $260_1$. For example, packets may be transferred between multi-core processor P9 and management processor $250_1$ (and/or processor accelerator $260_1$) via PCIe switches $225_3$ and $240_2$. Note that packet transfers between multi-core processors P1-P16 and processor accelerator $260_1$ are performed on x8 PCIe lanes, with a throughput of about 12 Gbps.

Packets may also be transferred between multi-core processors P1-P16 located on different application service modules $201_1$-$201_4$ using PCIe switches $225_1$-$225_4$, packet processing FPGAs $220_1$-$220_8$ and switch fabric chips $215_1$-$215_2$. For example, packets may be transferred between multi-core processors P1 and P5 through a path that extends through PCIe switch $225_1$, packet processing FPGA $220_1$, switch fabric chip $215_1$, packet processing FPGA $220_3$, and PCIe switch $225_2$. Note that the throughput of this path is about 12 Gbps in the illustrated example.

In the above described manner, packets may be transmitted to/from multi-core processors P1-P16, management processor $250_1$ and processor accelerator $260_1$ on high speed (12 Gbps) data paths, such that each of the multi-core processors P1-P16, management processor $250_1$ and processor accelerator $260_1$ may operate at their full processing speeds, without any speed limitations being imposed by the ingress/egress data paths. As a result, a large number of multi-core processors may be included in the network device 300, wherein each additional multi-core processor results in a substantially linear increase in processing power of the network device 300 (as long as the PCIe switch fabric is able to transfer packets to each of the multi-core processors at a required average rate). For example, network device 300 is capable of providing two 12 Gbps paths between switch fabric 215 and each of the application services modules $201_1$-$201_4$ at a given time. Each of the sixteen multi-core processors P1-P16 therefore has an average data path bandwidth of about 6 Gbps (2×12 Gpbs/4) (i.e., each of the processing cores $C_X$ has an average data path bandwidth of about 3 Gbps). As long as each of the multi-core processors P1-P16 is able to operate without limitations in response to this data path bandwidth, then each of the multi-core processors P1-P16 provides a substantially linear increase in the processing power of network device 300.

Figure 4:
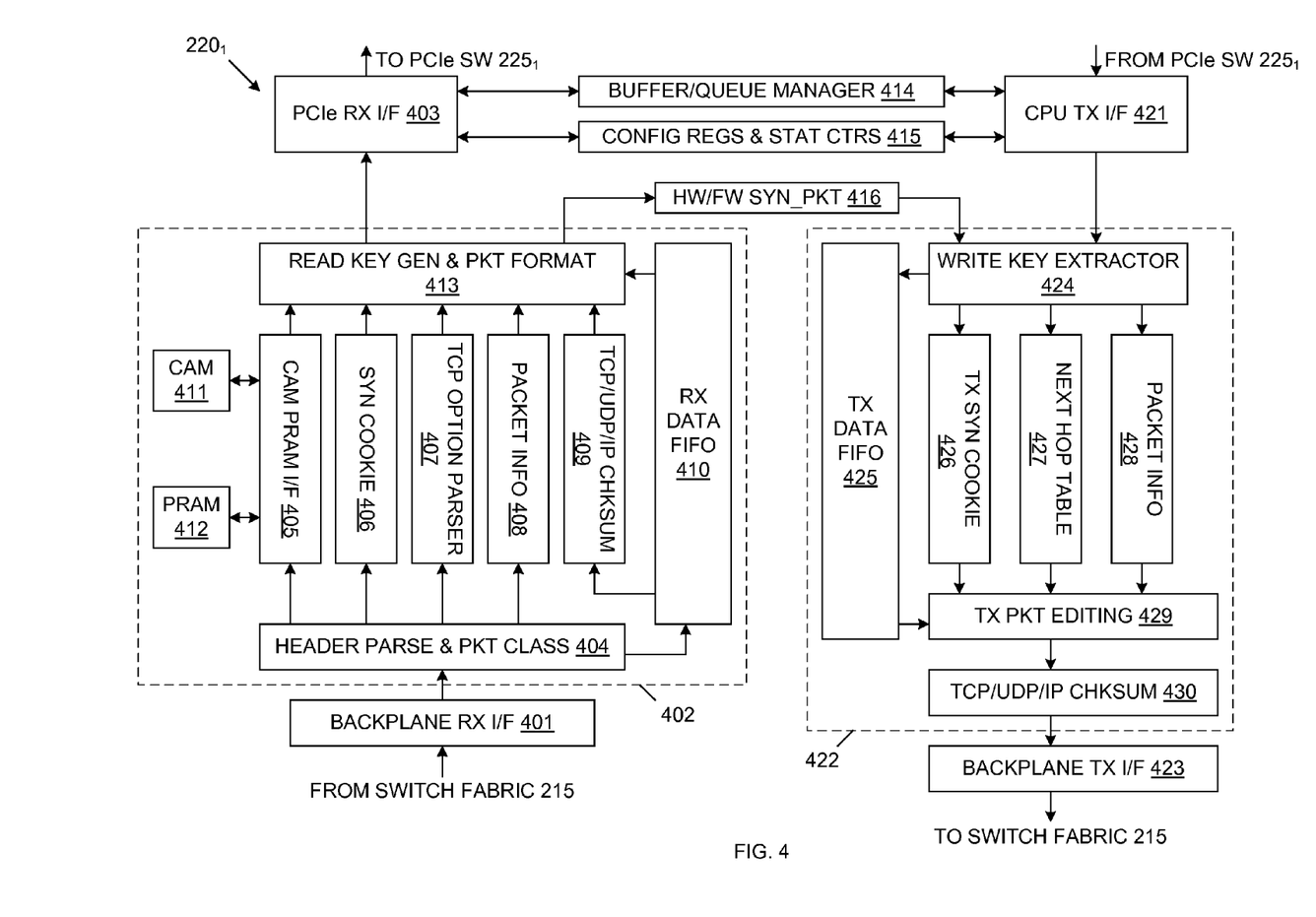
FIG. 4 is a block diagram of logic included within a packet processing field programmable gate array (FPGA) of a multi-core network device in accordance with one embodiment of the present invention.

FIG. 4 is a block diagram that illustrates functions implemented by packet processing FPGA $220_1$ in accordance with one embodiment of the present invention. It is understood that packet processing FPGAs $220_2$-$220_8$ operate in the same manner as packet processing FPGA $220_2$. As illustrated in FIG. 4, packet processing FPGA $220_1$ includes backplane receive interface 401, receive engine 402, PCI receive interface 403, buffer/queue manager 414, configuration registers & status counters 415, hardware forwarding (HW/FW) SYN packet logic 416, processor transmit interface 421, transmit engine 422 and backplane transmit interface 423.

Receive engine 402 includes header parse & packet classification logic 404, CAM/PRAM interface 405, SYN Cookie logic 406, TCP option parser 407, packet information logic 408, TCP/UDP/IP Checksum logic 409, receive data FIFO 410, CAM 411, PRAM 412, and read key generator & packet formatting logic 413.

Transmit engine 422 includes write key extractor 424, transmit data FIFO 425, transmit SYN cookie logic 426, next hop table 427, packet information logic 428, transmit packet editing logic 429, and TCP/UDP/IP checksum logic 430.

In the ingress forwarding path, backplane receive interface 401 receives packets from switch fabric 215, converts these packets into 256-bit data, and transmits this data to header parse & packet classification logic 404. Logic 404 parses the received packet for TCP source/destination ports, IP address, destination MAC address, VLAN ID and TCP flags, and provides the results to CAM/PRAM interface 405, SYN Cookie logic 406, TCP option parser 407, packet information logic 408, TCP/UDP/IP checksum logic 409 and receive data FIFO 410. CAM/PRAM interface 405 performs lookups using CAM 411 and PRAM 412 to differentiate between hardware forwarding SYN cookie traffic and traffic to be sent to the multi-core processors P1-P4. SYN cookie logic 406 implements SYN attack protection in response to valid TCP SYN and ACK packets. TCP option parser 407 provides TCP option support (e.g., security access control (SAC), window scale, time stamp and maximum segment size (MSS)) in response to a valid TCP packet. Packet information logic 408 identifies the type of packet in response to the packet header. TCP/UDP/IP checksum logic 409 performs a checksum check in response to IP and TCP/UDP checksum information present in the packet. Receive data FIFO 410 stores the received packet data. Read key generator & packet formatting logic 413 receives the packet data from receive data FIFO 410, and also receives the outputs of blocks 405-409. In response, read key generator & packet formatting logic 413 creates a read key, and combines this read key with the packet data received from receive data FIFO 410, thereby creating a write packet that is transmitted through PCIe receive interface 403 to PCIe switch $225_1$. Buffer/queue manager 414 manages the packet queues implemented by the processor memory blocks M0-M7. For example, buffer/queue manager 414 maintains counts of packets written to/read from processor memory blocks M0-M7 to determine whether the queues implemented within these memory blocks are empty/full (or almost empty/almost full).

In the egress forwarding path, multi-core processors P1-P4 will send packets to processor transmit interface 421 through PCIe switch $225_1$. Processor transmit interface 421 forwards the received packets to write key extractor 424, which extracts the write key (e.g., the first 32-bits of the packet) and sends the resulting packet data to transmit data FIFO 425, transmit SYN cookie logic 426, next hop table 427, and packet information logic 428. Transmit SYN cookie logic 426 provides TX SYN attack protection in response to the received packet data. Next hop table 427 provides a new L2 destination address/source address/VLAN for the outgoing packet in response to the extracted write key. Packet information logic 428 performs packet decoding in response to the valid packet headers. Transmit data FIFO 425 stores the received data packet.

In accordance with one embodiment, packet processing FPGA $220_1$ may receive interleaved portions of packets (packet cells) from the various multi-core processors P1-P4. Thus, the transmit data FIFO 425 implements four transmit queues, one for each of the four multi-core processors P1-P4. Each transmit queue is populated with packet cells from the corresponding multi-core processor until an entire packet is received. When a complete packet is stored in transmit data FIFO 425, this packet is provided to transmit packet editing logic 429 for further processing.

Transmit packet editing logic 429 receives the data packet from transmit data FIFO 425, and modifies this packet in response to the results provided by logic blocks 426-428. Transmit packet editing logic 429 also generates a header (e.g., a Higig2 header) that is attached to the outgoing packet. The resulting packet is provided to TCP/UDP/IP checksum logic 430, which performs checksum calculations on the received packet, and makes corrections to the packet as necessary. The resulting packet is transmitted through PCIe transmit interface 423 to switch fabric 215.

In the foregoing manner, multi-core network device 300 provides a unique hierarchical fabric architecture, which includes one level for data plane connectivity, another level for inter-processor connectivity and another level for control plane connectivity.

The multi-core network device 200/300 of the present invention advantageously achieves a substantially linear increase in processing power for each added multi-core processor, thereby enabling much higher performance than conventional network switching devices.

The multi-core network device 200/300 of the present invention also provides benefits of scalability, high performance, power and heat management, upgradability (in the switching fabric and processing elements), and the efficient load balancing of specialized functions, such as SSL.

Although the present invention has been described in connection with various embodiments, it is understood that variations of these embodiments would be obvious to one of ordinary skill in the art. For example, although a PCI Express switch fabric has been included in the described embodiments, it is understood that other switch fabrics that implement point-to-point serial links may replace the PCI express switch fabric in other embodiments. Thus, the present invention is limited only by the following claims.

We claim:

1. A multi-processor architecture comprising:
   a plurality of blades, each including: a plurality of processors, a switch fabric that implements connections using point-to-point serial links, wherein the switch fabric is coupled to each of the plurality of processors, and packet processing logic coupled to the switch fabric;
   a first external switch fabric that implements connections using point-to-point serial links, wherein the first external switch fabric is coupled to each switch fabric of the plurality of blades; and
   a management processor coupled to the first external switch fabric.

2. The multi-processor architecture of claim 1, further comprising a processor accelerator coupled to the first external switch fabric.

3. The multi-processor architecture of claim 1, wherein the switch fabric of each of the blades comprises a PCI-Express (PCIe) switch.

4. The multi-processor architecture of claim 1, wherein each of the processors is a multi-core processor.

5. The multi-processor architecture of claim 1, wherein each of the processors is coupled to the switch fabric on the same blade by a plurality of point-to-point serial links.

6. The multi-processor architecture of claim 3, wherein the first external switch fabric comprises a PCI-Express (PCIe) switch.

7. A multi-processor architecture comprising:
a plurality of blades, each including: a plurality of processors, a switch fabric that implements connections using point-to-point serial links, wherein the switch fabric is coupled to each of the plurality of processors, and packet processing logic coupled to the switch fabric;
a first external switch fabric that implements connections using point-to-point serial links, wherein the first external switch fabric is coupled to each switch fabric of the plurality of blades;
one or more line cards that receive and transmit data packets; and
a second external switch fabric coupling each of the one or more line cards to the packet processing logic of each of the plurality of blades.

8. The multi-processor architecture of claim 7, further comprising a third external switch fabric coupled to the first external switch fabric, the one or more line cards and the second external switch fabric, wherein the third external switch fabric implements connections using point-to-point serial links.

9. A method comprising:
routing a first packet from one of a first plurality of processors through a first switch fabric that implements connections using point-to-point serial links, wherein each of the first plurality of processors and the first switch fabric are located on a first blade;
routing a second packet from one of a second plurality of processors through a second switch fabric that implements connections using point-to-point serial links, wherein each of the second plurality of processors and the second switch fabric are located on a second blade;
routing the first packet from the first switch fabric and the second packet from the second switch packet through an external switch fabric that implements connections using point-to-point serial links; and
routing the first packet through the external switch fabric to a management processor.

10. The method of claim 9, further comprising routing the second packet through the external switch fabric to the management processor.

11. The method of claim 9, further comprising controlling operations of the first and second blades with the management processor.

12. The method of claim 9, further comprising routing the second packet through the external switch fabric to a processor accelerator.

13. A method comprising:
routing a first packet from one of a first plurality of processors through a first switch fabric that implements connections using point-to-point serial links, wherein each of the first plurality of processors and the first switch fabric are located on a first blade;
routing a second packet from one of a second plurality of processors through a second switch fabric that implements connections using point-to-point serial links, wherein each of the second plurality of processors and the second switch fabric are located on a second blade;
routing the first packet from the first switch fabric and the second packet from the second switch packet through an external switch fabric that implements connections using point-to-point serial links; and
routing the first packet through the external switch fabric to a processor accelerator.

14. The method of claim 13, further comprising performing a function with the processor accelerator in response to the first packet, thereby reducing processing requirements of the one of the first plurality of processors.

15. A multi-processor architecture comprising:
a first plurality of processors;
a first switch fabric that implements connections with point-to-point serial links, wherein the first plurality of processors are coupled to the first switch fabric by a first set of point-to-point serial links;
a second plurality of processors;
a second switch fabric that implements connections with point-to-point serial links, wherein the second plurality of processor are coupled to the first switch fabric by a second set of point-to-point serial links;
a third switch fabric that implements connections with point-to-point serial links, wherein the third switch fabric is coupled to the first switch fabric and the second switch fabric by a third set of point-to-point serial links; and
a management processor coupled to the third switch fabric.

16. The multi-processor architecture of claim 15, wherein the first plurality of processors and the first switch fabric are located on a first blade, and the second plurality of processors and the second switch fabric are located on a second blade.

17. The multi-processor architecture of claim 16, wherein the third switch fabric is located external to the first blade and the second blade.

* * * * *